D. H. HAYWOOD.
TRANSMISSION GEARING.
APPLICATION FILED JULY 17, 1909.
970,706.
Patented Sept. 20, 1910.
3 SHEETS—SHEET 2.
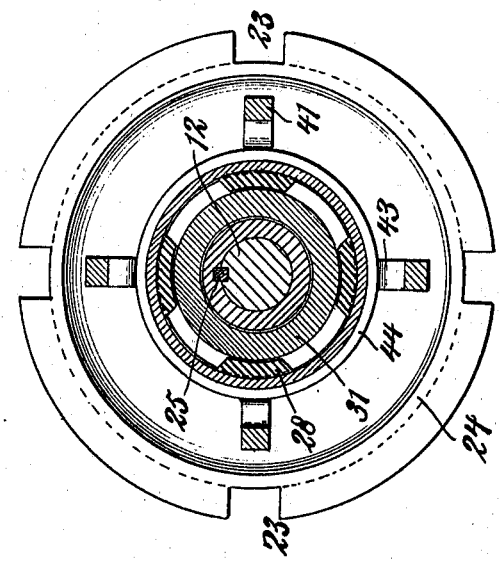
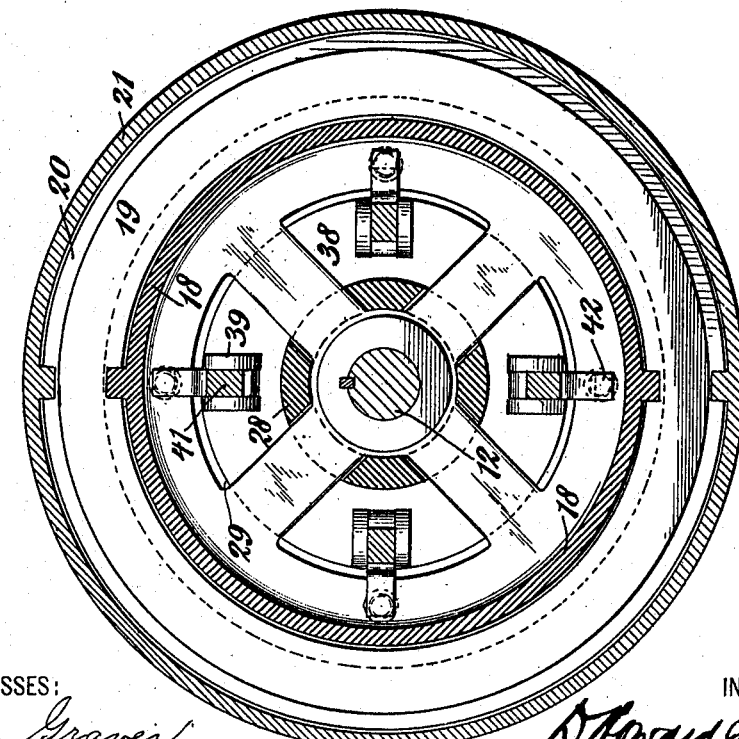

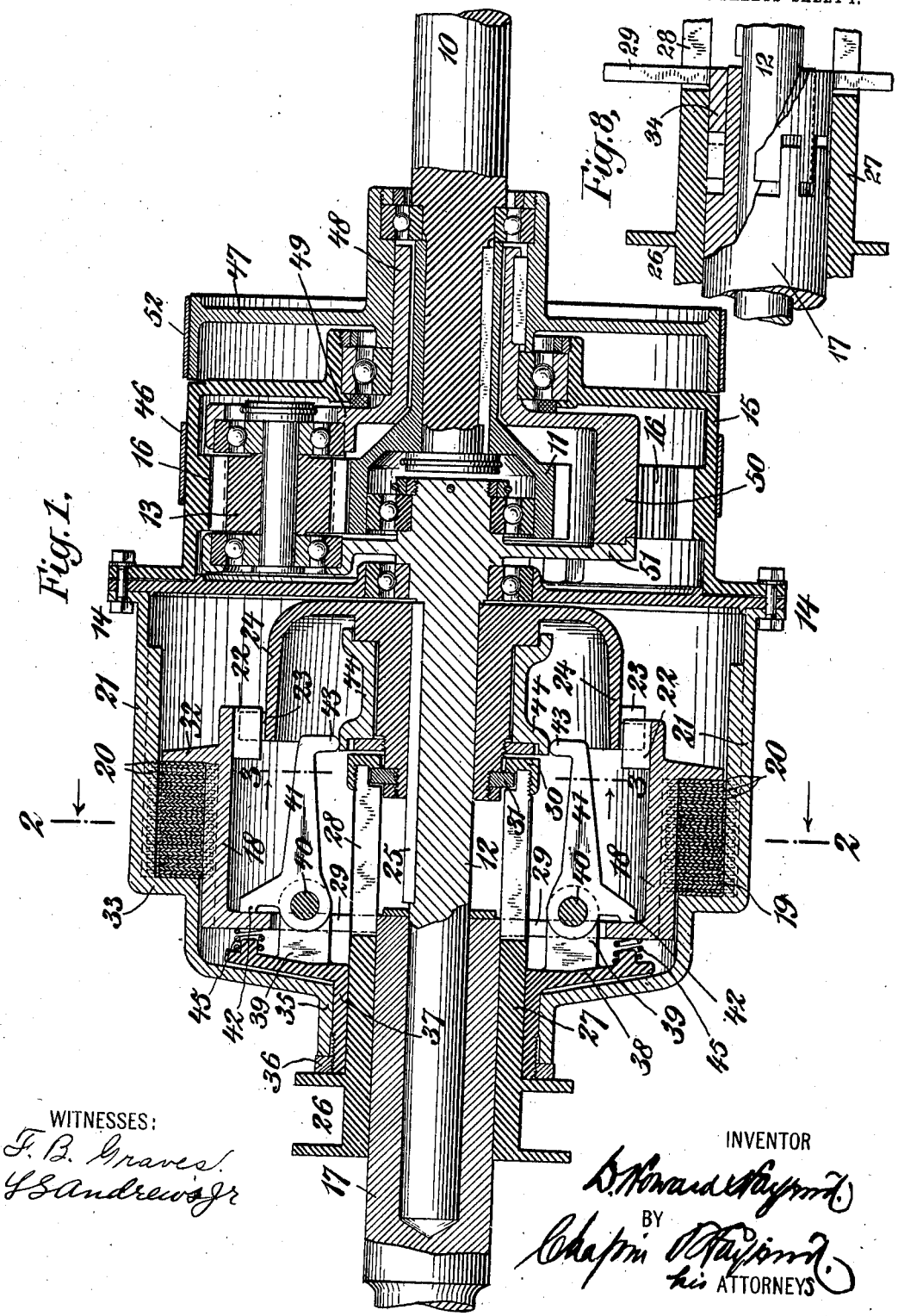

D. H. HAYWOOD.
TRANSMISSION GEARING.
APPLICATION FILED JULY 17, 1909.

970,706.

Patented Sept. 20, 1910.

3 SHEETS—SHEET 3.

WITNESSES:

INVENTOR

BY

ATTORNEYS

UNITED STATES PATENT OFFICE.

DANIEL HOWARD HAYWOOD, OF NEW YORK, N. Y., ASSIGNOR, BY MESNE ASSIGNMENTS, TO CARLSON MOTOR & TRUCK COMPANY, OF PHILADELPHIA, PENNSYLVANIA, A CORPORATION OF NEW YORK.

TRANSMISSION-GEARING.

970,706.

Specification of Letters Patent. Patented Sept. 20, 1910.

Application filed July 17, 1909. Serial No. 508,091.

*To all whom it may concern:*

Be it known that I, DANIEL HOWARD HAYWOOD, a citizen of the United States of America, and a resident of the borough of Manhattan, city, county, and State of New York, have invented certain new and useful Improvements in Transmission-Gearing, of which the following is a specification, reference being had to the accompanying drawings, forming a part thereof.

My invention relates to improvements in transmission gearing of the type in which changes of relative speed and direction are effected between the driving and driven elements, and my invention relates particularly to the planetary type of transmission gearing in which an intermediate gear is given a planetary movement around the central or sun gear in addition to the rotation of movement about its own axis.

The main object of my invention is to improve and simplify mechanism of this character; to render the operation of the various parts, by which changes in speed or direction of drive are accomplished, as automatic as possible, so as to compel the proper sequence of movements thereof; to reduce to a minimum the parts which have to be longitudinally moved when operating the gearing to change the speed or direction of movements of the driven part; and generally, to decrease the cost of manufacture of the structure as a whole, increase the durability of the parts, and while thoroughly protecting all the working parts with an inclosing casing, render the various parts inclosed thereby readily accessible for inspection, repairs, etc.

To these various ends my invention consists in certain novel details of construction and combinations of parts as will hereinafter more fully appear, and in order that my invention may be fully understood, I will now proceed to describe an embodiment thereof, having reference to the accompanying drawings illustrating the same, and will then point out the novel features in claims.

Figure 5:
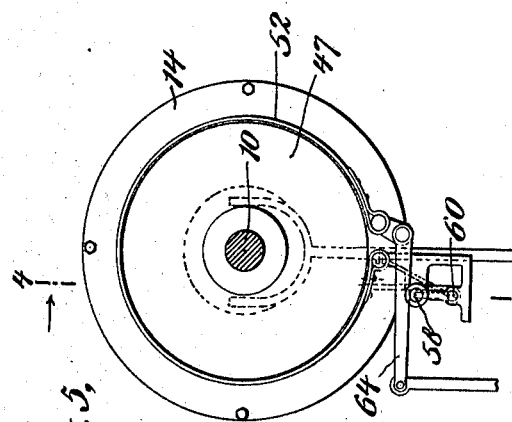
Figure 7:
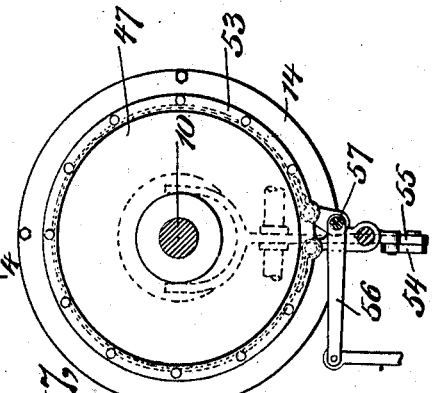
Figure 4:
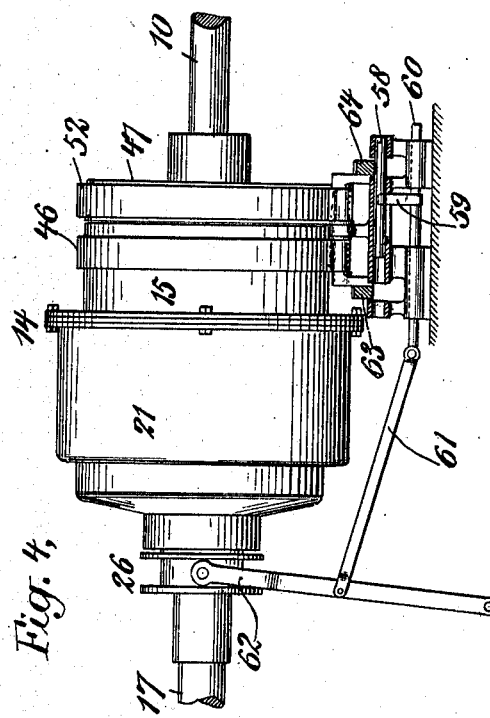
Figure 6:
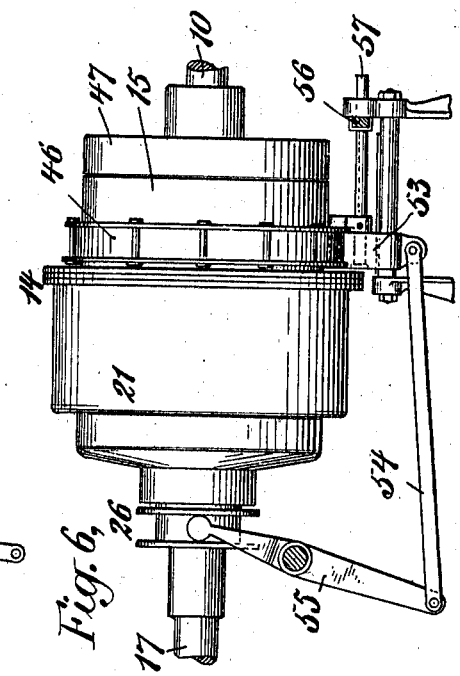

In the drawings: Figure 1 is a view in central vertical longitudinal section through such a transmission gearing. Fig. 2 is a view in transverse section therethrough upon the plane of the line 2—2 of Fig. 1. Fig. 3 is a detail view in transverse section therethrough upon the plane of the line 3—3 of Fig. 1. Fig. 4 is a view in side elevation of gearing showing also the clutch operating means and the means interlocking therewith for controlling the operation of the restraining means. Fig. 5 is an end view of the same. Fig. 6 is a view in side elevation similar to Fig. 4, but showing a slightly modified form of the controlling and interlocking means. Fig. 7 is an end view of the parts shown in Fig. 6. Fig. 8 is a detail view of a modified construction.

In general, the mechanism comprises a driving shaft 10 having a central or sun gear 11 fast thereon, an intermediate shaft 12 which carries an intermediate planetary gear wheel 13, the teeth of which are arranged in mesh with the teeth of the sun gear 11, and a casing 14 which includes a drum 15 having an internal ring of teeth 16 within the same, such teeth being disposed in mesh with the teeth of the pinion 13 and a driven shaft 17. The driven shaft 17 is provided with a head 18 to which is fitted one set of disks 19 of a friction clutch, the other set 20 of which are carried by a drum 21 which forms a part of the casing 14. The head 18 and the drum 21 are provided respectively with longitudinally disposed keys or projections which engage corresponding notches in the two sets of disks 19 and 20 in a manner well known in connection with this form of clutch, whereby the two sets of disks will be caused to rotate positively with the members carrying them, but are permitted longitudinal movement so that pressure may be exerted end-wise to force them into frictional engagement with each other, or when such pressure is relieved they may move sufficiently to free themselves whereby to permit them to have relative rotation with respect to each other. The head 18 is also provided with a set of teeth 22 which are arranged for engagement with notches 23 in a head 24 which is secured fast upon the intermediate shaft 12. The teeth 22 and the notches 23, with the parts in which they are arranged, form a positive or jaw clutch whereby to positively lock the parts, viz., the heads 18 and 24, and hence the driven shaft 17 and the intermediate shaft 12, together, when they are engaged as is shown in Fig. 1. The head 24, is, however, allowed to have a sliding movement upon the shaft 12, being splined thereto as is shown at 25, whereby such relative longitudinal movement will not affect the rotative engagement of the parts, this relative movement permitting the teeth 22 and notches 23 to be disengaged when desired. This longitudinal movement may be imparted to the head 24 through the medium of a collar 26 which surrounds the shaft 17, the said collar being disposed upon the end of a sleeve 27 provided with arms 28 which extend to within the device through openings 29 in the head 18 carried by the shaft 17. At their inner ends the arms 28 are provided with a collar 30 which engages a flange 31 carried by the head 24.

It will be seen that while by the foregoing construction longitudinal movements which are imparted to the collar 26 outside of the casing 14, will be readily transmitted to the head 24 within the casing, yet relative rotation of the various parts will be in no way interfered with. The sleeve 27 is, of course, compelled to rotate with the shaft 17 because of the fact that the arms 28 pass through the openings 29 in the head 18 carried by the said shaft. On the other hand the engagement of the arms 28 and collar 30 with the flange 31 is such as to permit relative rotation of the head 24 with respect to the sleeve 27 and parts carried thereby, because although the head 24 rotates with the head 18 and shaft 17, and hence with the sleeve 27 at such time as the teeth 22 are engaged by the notches 23 of the positive or jaw clutch, still, as will be presently seen, when the said teeth or projections are disengaged by the longitudinal movement of the head in a manner and by operation of the parts just described, relative movement between the parts will ensue. The operation of the disk clutch is also brought about by longitudinal movements of the head 24, and in the following manner: The head 18 is provided with a flange 32 which bears against the two sets of disks at one end thereof, while at the other end the said disks bear against an abutment 33 formed as a part of the drum 21. The said drum is provided with a bearing sleeve 35 which is mounted concentrically about the shafts 12 and 17 and the end of the sleeve 35 bears against an adjusting nut 36 which is carried by another concentric sleeve 37, disposed between the longitudinally movable sleeve 27 and the bearing sleeve 35 just described. The sleeve 37 is provided with a flange 38 which forms a support for lugs 39 which pass through the openings 29 in the head 18 above described, and serve as a support for the pivot pins 40 of operating arms 41. The operating arms 41 have portions 42 which bear against the head 18 and fingers 43 which are engaged by a rotary cam 44 carried by the head 24. The cam 44 has two rises,—one at each end thereof,—and a depressed portion between them. When the fingers 43 are engaged by either of the rise portions of the cam the portion 42 bears against the head 18 to force it and the flange 32 carried thereby, toward the abutment 33 of the drum 21, the support for the arms 41 being held at the time against longitudinal movement with respect to drum 21 by means of the nut 36. The effect of the pressure thereby exerted will be to cause such a powerful frictional engagement of the two sets of disks as to hold them together. When the fingers 43 are allowed to enter the depressed portion of the cam 44, springs 45 located between the head 18 and the flange 38 tend to force the flange 32 away from the abutment 33 whereby to relieve such end pressure between the two sets of disks and so to permit relative rotation thereof.

With the parts in the position in which they are shown in Fig. 1, the intermediate and driven shafts 12 and 17 will be locked together through the engagement of the positive or jaw clutch 22 and 23, while the casing 14 will be locked to rotate with the driven shaft 17 through the disk clutch 19, 20, etc. As the effect of this will be to lock the drum 15, with its ring gear 16, to rotate with the member which carries the planetary or intermediate gear 13, it will follow that the said intermediate or planetary gear 13 will be prevented at such time from having any independent rotative movement about its own axis, but will be compelled to move bodily with the casing. As the teeth thereof are in engagement with the teeth of the sun gear 11 it will then follow that if rotative movements are applied to the driving shaft 10 such rotative movements will be imparted directly, without any change of speed or direction, to the driven shaft 17. This is known as "direct" drive or "high speed" drive.

To transmit driving movements from the driving shaft 10 to the driven shaft 17 in the same direction but at a lower rate of speed, it is necessary, first, to move the head 24 to an intermediate position whereby the friction disk clutch will be relieved of pressure and the casing and driven shaft thereby permitted to have relative movements, and then to apply a restraining device to the casing so as to (preferably) hold it against any rotative movement at all, or at least to cause it to rotate at a slower speed than the said shaft 17. As such a restraining device I have provided a brake band 46 which is adapted to be caused to engage the drum 15 to restrain the same, such band being adapted to be operated after the clutch operating member 24 has been moved to its intermediate position. Under such circumstances movements of rotation of the driving shaft 10 and sun gear 11 will be imparted to the planetary or intermediate gear wheel 13. This gear wheel will now be permitted to rotate about its own axis, as well as to be caused to move in an orbital or planetary path with respect to the axis of the shafts 12 and 17, but the ratio of the gearing is such as to cause the speed of such orbital or planetary movement to be less than the speed of the shaft 10. This will cause movements at a lower rate of speed, but in the same direction, to be transmitted from the shaft 10 to the shaft 12, and as the longitudinal movement of the head 24 has so far not been sufficient to release the teeth 22 from engagement with the notches 23, and the engagement thereof locks the shafts 12 and 17 together, such movements of the shaft 12 will be positively imparted to the shaft 17, and the result will be a low speed forward driving of the shaft 17.

In order to transmit reverse driving movements from the shaft 10 to the shaft 17 the band 46 must be released from engagement with the drum 15, the head 24 must be moved to the limit of its movement to the left as shown in Fig. 1, and the intermediate shaft must be held against rotation so that while the planetary or intermediate gear wheel 13 will be free to rotate about its own axis no planetary or orbital movement thereof will be permitted, or at least any such planetary or orbital movement must be restrained so as to be at a relatively lower rate of speed. In order to restrain the shaft 12 I have provided the same with a brake drum 47 which is secured to rotate therewith, the hub of the said brake drum being keyed to the hub 48 of a disk 49 which forms a part of the mounting for the axle of the pinion 13, the said disk 49 being provided with a flange 50 which is secured to another disk 51 which is carried directly by the said shaft 12. When the head 24 has been moved to its proper position and the drum 47 has been suitably restrained, movements of the driving shaft 12 and sun gear 11 will be transmitted through the intermediate gear 13 (the axis of which is now held against planetary or orbital movements) to the ring gear 16 and casing 14 at a reduced rate of speed and in the opposite direction. At this time the friction disk clutch will have been again operated by reason of the engagement of the fingers 43 with the second rise of the cam 44, while the positive or jaw clutch will have been disengaged so as to free the driven shaft 17 from its engagement with the intermediate shaft 12, whereby relative movements of rotation between them will be permitted. The casing in revolving backward at a low rate of speed will carry the driven shaft with it through the friction disk clutch above referred to, so that the shaft 17 will be driven backward and at a reduced rate of speed with respect to the driving shaft 10.

For the purpose of restraining the shaft 12 I may provide an individual brake band 52 therefor, or I may move the brake band or other restraining device 46 of the drum 15, bodily to the right (as viewed in Fig. 1) so as to bring it in a position to engage the drum 47, and in Figs. 4, 5, 6, and 7 I have shown both methods of operating the mechanism. In Fig. 6 the band or restraining device 46 is shown as carried by an element 53 which is connected through a link 54 and lever 55 with the collar 26. An operating lever 56 is shown as splined to a rock shaft 57 which is also carried by the said element 53, the splined connection maintaining the operating lever in operative engagement with the rock shaft 57 while permitting the rock shaft to be moved longitudinally therethrough when the member 53 is moved. The aforesaid connection is so arranged as to cause the band 46 to surround the drum 15 when the clutch operating member is adjusted to the inner position in which it is shown in Figs. 1 and 6, or when it has been adjusted to an intermediate position as above described, and to cause the said band to surround the drum 47 and to be clear of the drum 15 when it has been moved all the way over to the left so as to adjust the parts in their "reverse" position as aforesaid. By this arrangement it will be impossible to restrain the wrong member when the clutch operating device has been set for intermediate or reverse drive, and the only effect of operating the restraining device when the parts are in a high speed position would be to cause the same to act as an ordinary brake upon all the parts. If two bands or restraining devices be employed as is shown in Fig. 4, I preferably employ an interlocking device to prevent the operation of the wrong band, such interlocking device conveniently including a longitudinally movable locking pin 58 which is connected through a head 59 and slide 60 with a link 61, the opposite end of which is connected with a lever 62 which is engaged by the collar 26. The pin 58 is arranged to be moved into the path of the movement of levers 63—64 which are arranged to control the movements of bands 46 and 52 respectively. With the parts in the position in which they are shown in the drawings, the controlling lever 64 is locked against movement by the presence of the pin 58 so that at such time it is impossible to operate the band 52, while on the other hand the band 46 may be operated freely. When the parts are moved to an intermediate position the pin still prevents the movement of the operating lever 64 and permits movement of the lever 63, while when the parts have been moved all the way to the other position,—that is to say, to effect reverse drive,—the operating lever 63 will be locked against movement and the operating lever 64 will be free so as to permit the proper operation of the restraining device or band 52.

While I have referred to the casing and the shafts as "longitudinally stationary" it will, of course, be understood that some slight relative longitudinal movement is necessary between the disk bearing abutment of the said casing and the flange 32 upon the head 18 carried by the said driven shaft, when the disk clutch is operated, but this relative movement is a very slight one and indeed is practically negligible in the general construction of the mechanism, the slight play ordinarily existing between the various parts and in the bearings being sufficient for the purpose. If, however, this play be found not to be sufficient, or if, for any reason, it be desired to provide for a relative movement, the head 18 may be allowed to move slightly with respect to the driven shaft 17, and in Fig. 8 I have shown a structure embodying such modification, the head 18 being provided with a sleeve 34 which, while it is connected to rotate with the shaft 17, is so fitted thereto as to be free to have a slight longitudinal movement with respect to it.

What I claim is:

1. Transmission gearing including a driving element, a driven element, and change speed gearing including two clutches for connecting the said elements in different driving relations, the two said clutches including a single operating element by movements of which the one, or the other, or both of the said clutches are operatively connected,—a casing for inclosing the gearing and the said operating element, the said casing being held against any substantial longitudinal movement, and a sleeve having a portion located at the exterior of the casing by which it may be manipulated and having another portion passing to the interior of the casing and connecting with the said operating element.

2. Transmission gearing including a driving element, a driven element, and change speed gearing including two clutches for connecting the said elements in different driving relations, a rotatable casing for inclosing the said clutches, the said casing being held against any substantial longitudinal movement, and operating means for the clutches including a rotatable element having a portion located without the casing, and another rotatable element relatively rotatable with respect to the first said element located within the said casing.

3. Transmission gearing including a driving shaft, an intermediate shaft, a driven shaft, and change speed gearing including two clutches for connecting the said shafts in different driving relations, a casing for inclosing the said clutches, the said casing being held against any substantial longitudinal movement, and operating means for the clutches including a rotatable sleeve having a portion located without the casing, and a rotatable member relatively rotatable with respect to the said sleeve located within the said casing.

4. Transmission gearing including a driving element, a driven element, and change speed gearing including two clutches for connecting the said elements in different driving relations, the two said clutches including a single longitudinally movable operating element adapted to operatively connect one only of the said clutches when at the limit of its movement in one direction, to operatively connect the other only of the said clutches when in an intermediate position, and to operatively connect both of the said clutches when at the limit of its movement in the other direction, a casing for inclosing the said gearing and the operating element, and a sleeve having a portion located at the exterior of the casing by which it may be manipulated, and having another portion passing to the interior of the casing and connecting with the said operating element.

5. In transmission gearing, the combination with a driving element, an intermediate element, and a driven element, all arranged in line with each other, of a central or sun gear mounted upon the driving element, an intermediate planetary gear carried by the intermediate element, a ring gear concentrically mounted with respect to the said elements, the intermediate gear being disposed between the sun gear and the ring gear, a disk clutch, one member of which is secured to rotate with the ring gear and the other member of which is secured to rotate with the driven shaft, a positive sliding jaw clutch, one member of which is mounted to rotate with the driven element and the other member of which is mounted to rotate with the intermediate element, a casing surrounding the said gearing, the said intermediate member, and the said clutches, the said casing being held against any substantial longitudinal movement, means operated by the movement of the latter said sliding clutch member for operating the disk clutch, and means operated from the exterior of the casing for longitudinally moving the last said element of the sliding jaw clutch to move the same into and out of engagement with its co-acting member and also for operating the disk clutch.

6. In transmission gearing, the combination with a driving element, an intermediate element, and a driven element, all arranged in line with each other, of a central or sun gear mounted upon the driving element, an intermediate planetary gear carried by the intermediate element, a ring gear concentrically mounted with respect to the said elements, the intermediate gear being disposed between the sun gear and the ring gear, a disk clutch, one member of which is secured to rotate with the ring gear and the other member of which is secured to rotate with the driven shaft, a positive sliding jaw clutch, one member of which is mounted to rotate with the driven element and the other member of which is mounted to rotate with the intermediate element, a casing surrounding the said gearing, the said intermediate member, and the said clutches, the said casing being held against any substantial longitudinal movement, means operated by the movement of the latter said sliding clutch member for operating the disk clutch, means operated from the exterior of the casing for longitudinally moving the last said element of the sliding jaw clutch to move the same into and out of engagement with its co-acting member and also for operating the disk clutch, and means accessible from the exterior of the casing for adjusting the normal relative position of the disk clutch members.

7. In transmission gearing, the combination with a driving shaft, an intermediate shaft, and a driven shaft, all arranged in line with each other and held against longitudinal movement, of a central or sun gear mounted upon the driving shaft, an intermediate planetary gear carried by the intermediate shaft, an inclosing casing for the said gearing and the said intermediate shaft, the said casing being held against any substantial longitudinal movement, a ring gear carried by the said casing, the intermediate gear being disposed between the sun gear and the ring gear, a disk clutch, one member of which is secured to rotate with the casing and the other member of which is secured to rotate with the said driven shaft, a positive sliding jaw clutch one member of which is mounted to rotate with the driven shaft and the other member of which is mounted to rotate with the intermediate shaft, the latter said member being arranged to slide longitudinally upon the said intermediate shaft, means operated by the movement of the said latter member for operating the disk clutch, and means operated from the exterior of the casing for moving the longitudinally movable member of the sliding jaw clutch, upon the intermediate shaft, both members of both the said clutches being housed entirely within the said casing.

8. In transmission gearing, the combination with a driving shaft, an intermediate shaft, and a driven shaft, all arranged in line with each other and held against longitudinal movement, of a central or sun gear mounted upon the driving shaft, an intermediate planetary gear carried by the intermediate shaft, an inclosing casing for the said gearing and the said intermediate shaft, the said casing being held against any substantial longitudinal movement, a ring gear carried by the said casing, the intermediate gear being disposed between the sun gear and the ring gear, a disk clutch one member of which is secured to rotate with the casing and the other member of which is secured to rotate with the said driven shaft, a positive sliding jaw clutch one member of which is mounted to rotate with the driven shaft and the other member of which is mounted to rotate with the intermediate shaft, the latter said member being arranged to slide longitudinally upon the said intermediate shaft, means operated by the movement of the said latter member for operatively connecting the said disk clutch when at the limit of its sliding movement in either direction but for freeing the said disk clutch when in an intermediate position, and means operated from the exterior of the casing for moving the longitudinally movable member of the sliding jaw clutch upon the intermediate shaft, both members of both the said clutches being housed entirely within the said casing.

9. In transmission gearing, the combination with a driving shaft, an intermediate shaft, and a driven shaft, all arranged in line with each other, of a central or sun gear mounted upon the driving shaft, an intermediate planetary gear carried by the intermediate shaft, an inclosing casing provided with a gear ring concentric with the sun gear, the said casing being held against any substantial longitudinal movement, the said intermediate gear being disposed between the sun gear and the ring gear, a head secured to rotate with the driven shaft, a disk clutch including a set of disks mounted to rotate with the casing, and another set of disks mounted to rotate with the said head, the disks being arranged to bear at one end against an abutment of the casing and at the other end against a flange carried by the said head, positive jaw clutch elements, one set of which is carried by the said head and the other set of which is carried by a head secured upon the intermediate shaft to rotate therewith, but adapted to slide longitudinally thereon, means operated from the exterior of the casing for sliding the last said head upon the intermediate shaft, a cam carried by the last said head, operating arms having portions engaged by the said cam and other portions for engaging the disk clutch head which is secured to rotate with the driven shaft, and a member mounted to rotate with the said disk clutch head for pivotally supporting the said operating arms.

10. In transmission gearing, the combination with a driving shaft, an intermediate shaft, and a driven shaft, all arranged in line with each other, of a central or sun gear mounted upon the driving shaft, an intermediate planetary gear carried by the intermediate shaft, an inclosing casing provided with a gear ring concentric with the sun gear, the said casing being held against any substantial longitudinal movement, the said intermediate gear being disposed between the sun gear and the ring gear, a head secured to rotate with the said driven shaft, a disk clutch including a set of disks rotatively secured to the casing, and another set of disks secured to rotate with the said head, the disks being arranged to bear at one end against an abutment of the casing and at the other end against a flange carried by the said head, positive jaw clutch elements, one set of which is carried by the said head and the other set of which is carried by a head secured upon the intermediate shaft to rotate therewith but adapted to slide longitudinally thereon, means operated from the exterior of the casing for sliding the last said head upon the intermediate shaft, a cam carried by the last said head, operating arms having portions engaged by the said cam and other portions for engaging the disk clutch head which is secured to rotate with the driven shaft, a member mounted to rotate with the said disk clutch head for pivotally supporting the said operating arms, the said gearing, clutch members, heads, cam, and operating arms, all being inclosed within the said casing, and means accessible from the exterior of the casing for adjusting the normal position of the said member with the said casing.

11. In transmission gearing, the combination with clutch mechanism, change speed gearing, and two relatively rotatable members, both of which are held against any substantial longitudinal movement, of restraining means therefor, operating means for the clutch mechanism, and means controlled with the operation of the clutch mechanism for selecting the member to be restrained.

12. Transmission gearing including a driving shaft, an intermediate shaft, a driven shaft, and change speed gearing including two clutches for connecting the said gearing in different driving relations with the said shafts, and operating means for the clutches, two brake drums, a single brake element for coaction therewith, and means connected with the operating means for the clutches for shifting the brake element so as to cause it to operatively engage the one or the other of the said brake drums.

13. Transmission gearing comprising a driving shaft, an intermediate shaft, and a driven shaft, change speed gearing including two clutches for connecting the said shafts in different driving relations, a casing for inclosing the said clutches, the said casing being held against any substantial longitudinal movement, and having a portion constituting a brake drum, operating means for the two said clutches having a part located without and a part located within the said casing, another brake drum, restraining means for engaging either of the said brake drums, and means connected with the said clutch operating means for selecting which of the said brake drums is to be engaged by the said restraining means.

14. Transmission gearing including a driving shaft, an intermediate shaft, a driven shaft, and change speed gearing between the said shafts, two clutches for connecting the said gearing in different driving relations, a casing for inclosing the change speed gearing, the said casing being held against any substantial longitudinal movement, operating means for the two said clutches having a part located without and a part located within the casing, a brake drum, a brake element for engaging either the brake drum or the casing, and means connected with the clutch operating means for causing the said brake element to engage either the said brake drum or the said casing.

D. HOWARD HAYWOOD.

Witnesses:
F. B. GRAVES,
J. C. HARTMANN.